US006055899A

United States Patent [19]

Feit et al.

[11] Patent Number: 6,055,899

[45] Date of Patent: May 2, 2000

[54] MICRO-MECHANICAL ACTUATOR

[75] Inventors: Klaus Feit, Graben-Neudorf; Mathias Heckele, Linkenheim; Patrik Ruther, Karlsruhe; Klaus Weindel, Forst, all of Germany

[73] Assignee: Forschungszentrum Karlsruhe GmbH, Karlsruhe, Germany

[21] Appl. No.: 08/835,351

[22] Filed: Apr. 7, 1997

Related U.S. Application Data

[63] Continuation-in-part of application No. PCT/EP95/03707, Sep. 20, 1995.

[30] Foreign Application Priority Data

Oct. 8, 1994 [DE] Germany ............................ 44 36 008

[51] Int. Cl.$^{7}$ .............................. F01B 31/10; F16J 10/00

[52] U.S. Cl. .............................................. 92/154; 92/169.1

[58] Field of Search .......................... 92/154, 166, 169.1, 92/DIG. 2

[56] References Cited

U.S. PATENT DOCUMENTS 3,611,880 10/1971 Gulick ....................................... 92/154
5,362,213 11/1994 Komatsu et al. ....................... 417/418

FOREIGN PATENT DOCUMENTS 0 339 528 11/1989 European Pat. Off. .
89 315839 7/1991 Japan .
92 015167 8/1993 Japan .
92 152039 12/1993 Japan .

OTHER PUBLICATIONS

Yasushi et al., "Fluid Driven Nicroactuator with Feedback Mechanism", Feb. 7, 1993, Proccedings of the Workshop on Micro Electro Mechanical Systems, pp. 213–218.

*Primary Examiner*—F. Daniel Lopez
*Attorney, Agent, or Firm*—Klaus J. Bach

[57] ABSTRACT

In a micro-mechanical actuator having, disposed on a substrate, an actuator housing with a channel and a pressure chamber formed at one end of the channel, a piston with a guide rod projecting from one end and a piston rod projecting from the other end in the opposite directions is movably disposed in the channel and the rods are supported in slots formed in bearing blocks disposed at opposite ends of the piston for guiding the piston slideably in the channel, and a fluid admission and discharge passage extends through the substrate in the area of the pressure chamber whereby fluid can be admitted to, or removed from, the pressure chamber for actuating the piston.

3 Claims, 1 Drawing Sheet

MICRO-MECHANICAL ACTUATOR

This is a Continuation-In-Part Application of International application PCT/EP95/03707 designating the US and claiming priority of German application P 44 36 008.8 of Oct. 8, 1994.

BACKGROUND OF THE INVENTION

The present invention resides in a micro-mechanical actuator for generating forces in the range of several mN to about 100 mN and in the size range of some 100 μm with a piston movable in a passage to which fluid under pressure can be supplied at one side of the piston which has at the other side a piston rod for the transmission of the force generated by the piston.

Micro-mechanical actuators are used for various purposes. However, the forces that can be generated by these actuators are still very small. The actuators known so far can be used therefore only for applications where small forces of below the mN range are sufficient. Such an actuator is known for example from Sniegowski, J. J.: "A MICRO ACTUATION MECHANISM BASED ON LIQUID VAPOR SURFACE TENSION", 7th Int. Conf. On Solid State Sensors and Actuators, Yokohama, 1993. The actuator described therein includes a piston with piston rod which is moved by a vapor bubble in a housing of larger size. The piston is sealed in the housing by the surface tension of the vapor bubble wall. The piston itself is guided and supported by two leaf springs attached to the sides of the piston rod. Since the actuator is manufactured in conventional silicon technology, it does not have any structures with a high aspect ratio. This leads necessarily to small cylinder dimensions and consequently, because of the geometric dimensions and the limitations provided by the surface tension of the vapor bubble, to only small achievable actuator forces.

It is therefore the object of the present invention to provide a micro-mechanical actuator with which substantially greater forces can be achieved than is possible with micromechanical actuators known so far.

SUMMARY OF THE INVENTION

In a micro-mechanical actuator having, disposed on a substrate, an actuator housing with a channel and a pressure chamber formed at one end of the channel, a piston with a guide rod projecting from one end and a piston rod projecting from the other end in the opposite directions is movably disposed in the channel and the rods are supported in slots formed in bearing blocks disposed at opposite ends of the piston for guiding the piston slideably in the channel, and a fluid admission and discharge passage extends through the substrate in the area of the pressure chamber whereby fluid can be admitted to, or removed from, the pressure chamber for actuating the piston.

Particularly advantageous is an actuator manufactured in a process wherein the housing, the bearing support blocks and the piston, that is the whole actuator structure, are manufactured at the same time in an x-ray lithographic, or an x-ray depth lithographic galvano-plastic procedure or derivative molding or galvano-plastic molding procedures on a substrate, wherein the mechanical separation of the movable parts is achieved by applying in the appropriate areas local separation layers which, finally, are removed by etching.

With the actuator according to the invention, relatively large actuator forces in the area of 100 mN as well as relatively large actuator travel distances can be achieved. Also, fluid lubrication of the movable parts is provided for in an advantageous manner.

Details of the invention will be described below on the basis of the accompanying drawings.

DESCRIPTION OF A PREFERRED EMBODIMENT

Figure 1:
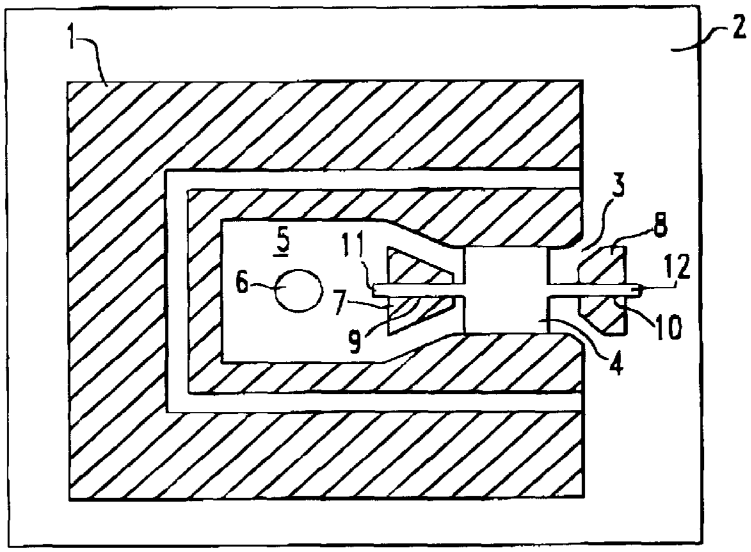
FIG. 1 is a cross-sectional top view of an actuator according to the invention.
Figure 2:
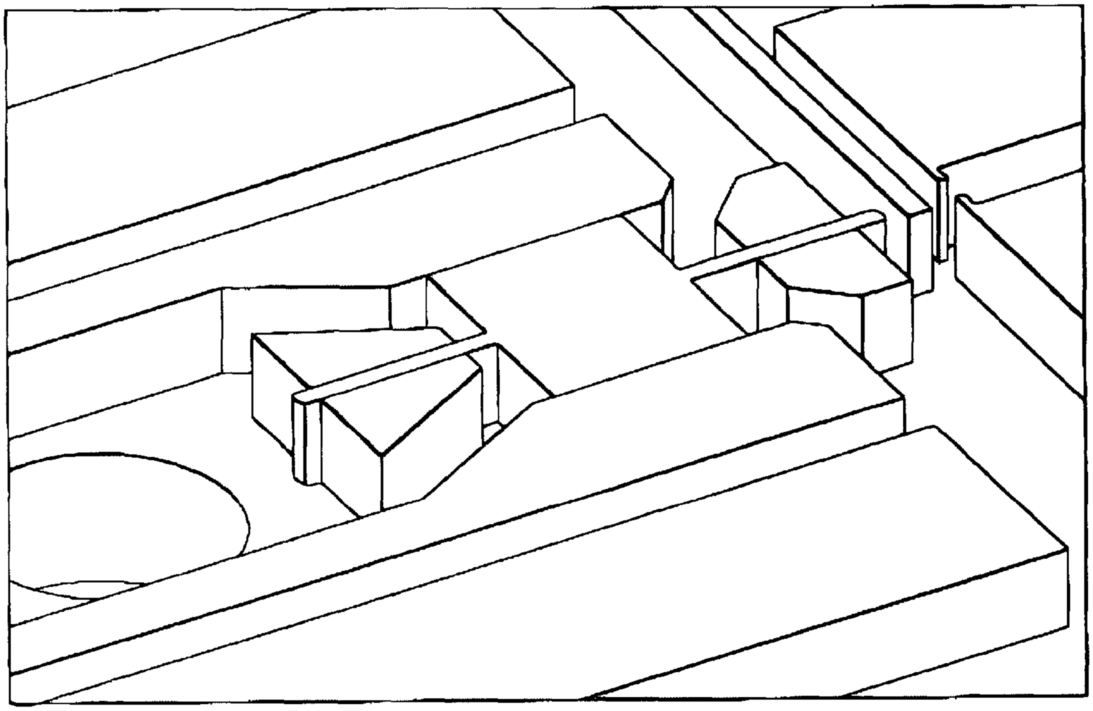
FIG. 2 is a perspective photographic view of an actuator made by LIGA techniques and shown without the cover, the photo having been obtained by a raster electromicroscopic procedure.

The actuator shown in the Figures includes a movable microstructure which is made by a combination of the LIGA procedure (x-ray depth lithography) with galvanic forming and plastic molding and with a sacrificial layer technique. This method makes it possible to produce microstructures with structure heights of up to several hundred micrometers with lateral dimensions of a few micrometers. By additionally utilizing a sacrificial layer technique, relative movable parts can be made at the same time. The principle of manufacture will be described later.

The actuator consists essentially of a flat housing 1 which is disposed on a substrate 2 to which it is firmly attached. The housing 1 includes a channel 3 in which a piston 4 is disposed and is movable therein axially back and forth. At one end, the piston 4 has a guide rod 11 and, at the opposite end, it has a piston rod 12 projecting therefrom in the direction of movement of the piston 4. The channel 3 leads at one end to a pressure chamber 5 with a bore 6 via which fluid under pressure can be admitted to the pressure chamber 5. Fluid under pressure admitted to the pressure chamber 5 generates a force on the piston 4 disposed in the passage 3. Fluid admitted through the bore 6 can also be discharged through the bore 6. At opposite sides of the piston 4 the housing 1 includes further bearing blocks 7 and 8 which are also attached to the substrate 2. The bearing blocks 7 and 8 have slots 9 and 10 slideably receiving the guide rod 11 and the piston rod 12 respectively. In this way, the piston 4 is guided in travel—that is in its actuation direction. The bearing block 7 is totally enclosed within the pressure chamber 5, so that there is no pressure differential formed across the bearing block. The bearing blocks have such a geometry (width, bearing play) that cogging of the piston 4 is prevented. The piston itself has lateral dimensions of about 400×450 μm. The gap width between the piston 4 and the channel 3 is about 2 μm. The piston 4 and the rods 11 and 12 in the channel 3 and in the slots 9 and 10 are lubricated for example by silicon oil.

The piston rod 12 projecting from the bearing block 8 transmits the force generated by the piston to outside elements which are not shown in the Figures. The force may be used for example to apply a bending force to a rod. The actuator as shown in the Figures is manufactured by the LIGA process and is shown open at the top. In order to close the pressure chamber 5 with the piston 4 and the whole actuator to obtain a closed pressure chamber 5 the housing includes a cover plate which however has been omitted in the figures to show the actuator design more clearly. The cover plate is firmly cemented onto the housing 1. However, a groove 13 extends around the actuator internals in order to prevent cement from entering the actuator interior. The movable piston 4 is sealed with respect to the housing 1 and the wall of the channel 3 and also the cover plate by the fluid lubricant whereby also the friction of the piston 4 in the channel 3 is reduced.

Below the manufacturing steps for making the actuator, that is relative movable microstructures, by the LIGA procedure are described in an exemplary manner.

First, a radiation insensitive plastic layer with a thickness of up to several hundred micrometers is provided. This so-called resist is applied to a substrate by direct polymerization with a sacrificial layer and a galvanic starter layer. The sacrificial layer of Ti with a thickness of 3–7 μm is pre-structured so that, with subsequent accurately controlled x-radiation, the parts of the microstructure to be later movable, that is for the actuator described above the piston 4 with the rods 11 and 12, are disposed on top of the sacrificial layer. Below the immovable parts which are anchored to the substrate such as the actuator housing 1 and the bearing, there is no sacrificial layer.

The resist is structured by well controlled synchrotron irradiation. The synchrotron irradiation has the advantage that it has a small wave length (0.2 to 0.5 mm) a high energy density and high parallelism. It is therefore possible to achieve a high precision picture of the x-ray mask over the whole resist thickness. The accuracy is in the submicrometer range over the whole structure height. With lateral dimensions of the structures in the micrometer range an aspect ratio (that is the ratio of structure height to minimum lateral dimension) of up to 100 can be achieved.

The irradiation changes the chemical composition of the resist in such a way that, during the subsequent development, the irradiated areas are dissolved and a negative of the desired structure is obtained. The spaces so generated are filled galvanically by a metal. Renewed irradiation without mask and the removal of the previously protected non-irradiated resist results in the desired microstructure. Finally, the Ti layer is etched away selectively with respect to the other materials so that the parts disposed on the sacrificial Ti layer, that is, in this case, the piston 4 becomes freely movable.

Before the last irradiation step, the microstructures are polished so as to provide a smooth surface for the cover plate which is necessary to provide a good seal for the actuator housing.

What is claimed is:

1. A micro-mechanical actuator with dimensions in the area of some 100 μm for generating forces in the range of some mN to about 100 mN, comprising a flat actuator housing firmly disposed on a substrate and having a channel formed therein with a pressure chamber formed adjacent said channel, a piston movably disposed in said channel and having a guide rod and a piston rod extending oppositely from said piston in the longitudinal direction of said channel, bearing blocks disposed on said substrate at opposite ends of said piston and in spaced relationship therefrom and having slots extending through said bearing blocks and receiving, and slideably supporting, said rods for guiding said piston, wherein at least one of said bearing blocks is totally enclosed within said pressure chamber, such that there is no pressure differential formed across said bearing block, said substrate having an opening extending therethrough in the area of said pressure chamber for admitting fluid under pressure to, and discharging it from, said pressure chamber for actuating said piston and a cover disposed on said actuator housing and sealed therewith to close said channel and pressure chamber.

2. An actuator according to claim 1, wherein said piston in said channel and said rods in the slots of said bearing blocks are lubricated by a fluid.

3. An actuator according to claim 1, wherein said housing, said bearing blocks and said piston, that is the whole actuator structure, are manufactured together in the same manufacturing steps on top of said substrate by x-ray lithographic, x-ray depth lithographic galvano-plastic or derivative molding or galvano-plastic molding procedures and wherein the relative movable parts are separated from the housing and/or substrate by providing, at the appropriate locations, first a separation layer which is later selectively removed by etching.

* * * * *